(12) United States Patent
Lu et al.

(10) Patent No.: US 12,159,144 B2
(45) Date of Patent: Dec. 3, 2024

(54) USB DEVICE, AND METHOD FOR SAME TO DISTINGUISH OPERATING SYSTEM OF MOBILE DEVICE

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 17/797,131

(22) PCT Filed: Sep. 10, 2021

(86) PCT No.: PCT/CN2021/117579
§ 371 (c)(1),
(2) Date: Aug. 3, 2022

(87) PCT Pub. No.: WO2022/100251
PCT Pub. Date: May 19, 2022

(65) Prior Publication Data
US 2024/0184590 A1    Jun. 6, 2024

(30) Foreign Application Priority Data
Nov. 12, 2020 (CN) .......................... 202011258160.8

(51) Int. Cl.
*G06F 13/00* (2006.01)
*G06F 9/4401* (2018.01)
(Continued)

(52) U.S. Cl.
CPC ........ *G06F 9/4411* (2013.01); *G06F 9/44536* (2013.01); *G06F 13/4068* (2013.01); *G06F 2213/0042* (2013.01)

(58) Field of Classification Search
CPC . G06F 9/4411; G06F 9/44536; G06F 13/4068
See application file for complete search history.

(56) References Cited

U.S. PATENT DOCUMENTS 7,752,029 B2 * 7/2010 Tamayo ................. G06F 11/261
703/20
8,661,164 B2 * 2/2014 Chen ...................... G06F 9/4411
710/10
(Continued)

*Primary Examiner* — Tammara R Peyton
(74) *Attorney, Agent, or Firm* — Hammer & Associates, P.C.

(57) ABSTRACT

A USB device capable of accurately distinguishing an operating system of a mobile device. The USB device comprises: an initialization setting module (301), a receiving and determining module (302), a saving and determining module (303), a first setting module (304), an organizing and determining module (305), a second setting module (306), a system type determination module (307), a first organizing module (308), a second organizing module (309) and a sending module (310). The USB device can accurately distinguish whether an operating system of a mobile device is an iOS operating system or a non-iOS operating system. Depending on different operating system types that are distinguished, different configuration descriptors and preset interface descriptors are returned to the mobile device, such that a device type of the USB device itself is reported to the mobile device.

17 Claims, 4 Drawing Sheets

(51) Int. Cl.
   *G06F 9/445*      (2018.01)
   *G06F 13/40*      (2006.01)

(56) References Cited

U.S. PATENT DOCUMENTS

| | | | |
|---|---|---|---|
| 9,928,197 B2* | 3/2018 | Lu | G06F 13/385 |
| 10,684,842 B2* | 6/2020 | Lin | H04L 41/082 |
| 10,955,888 B2* | 3/2021 | Wang | G06F 13/4282 |
| 2015/0293869 A1 | 10/2015 | Lu et al. | |
| 2017/0187807 A1* | 6/2017 | Clernon | H04L 67/34 |

* cited by examiner

USB DEVICE, AND METHOD FOR SAME TO DISTINGUISH OPERATING SYSTEM OF MOBILE DEVICE

FIELD OF THE INVENTION

The present invention relates to a USB device for distinguishing an operating system of a mobile device and a method for distinguishing the operating system of the mobile device by the USB device, which belongs to the field of communication security.

PRIOR ART

A USB device is a hardware device, which can connect to a mobile device (PC or a mobile terminal) via a USB port; almost all of the peripheral device, such as a mouse, a keyboard, a gamepad, a scanner, a digital camera, a printer, a hard disk, a security device, a CD-ROM and a network card, can connect to and communicate with the mobile device via running USB port, and the USB port is a default port which connects most peripheral devices of mobile device to the computer.

In the aspect of operating system platform supporting, iOS operating system, MacOS operating system and other systems which include android system, Windows system, and Linux system can support the USB port. When communicating with the mobile device, the USB device needs to distinguish a type of any device operating system exactly.

With development of the new version of operating system, the USB device in prior art cannot distinguish the type of operating system of mobile device accurately, and cannot determine whether the operating system of mobile device is iOS operating system or the non-iOS operating system, such as Android operating system, Harmony operating system, Blackberry operating system, or software operating system; and the USB device in prior art cannot report the device type of the USB device to the mobile device.

SUMMARY OF THE INVENTION

The object of the present invention is to provide a USB device and a method for distinguishing an operating system of a mobile device, which can distinguish exactly the operating system of the mobile device is iOS operating system or non-iOS operating system; and then reports a device type of the USB device to the mobile device according to the type of the operating system.

Thus, according to one aspect of the invention, there is provided a method for distinguish an operating system of a mobile device by a USB device, including the following steps:

S01) powering, by the USB device, on and initializing, setting a type of an operating system of a mobile device as unidentified;

S02) when receiving an instruction sent from the mobile device, determining, by the USB device a type of the instruction, and executing step S03 if the instruction is a setting address instruction; executing step SS04 if the instruction is an obtaining device descriptor instruction; and executing step S05 if the instruction is an obtaining configuration descriptor instruction;

S03) storing, by the USB device, a device address in the setting address instruction, and determining whether the type of operating system of the mobile device is unidentified, if yes, setting the type of operating system of mobile device as iOS operating system, and returning response data to the mobile device, and returning to step S02; otherwise, returning response data to the mobile device, and returning to step S02;

S04) organizing, by the USB device, response data according to the preset device descriptor and determining whether the type of operating system of mobile device is unidentified, if yes, setting the type of operating system of mobile device as non-iOS operating system, and returning the response data to the mobile device, and returning to step S02; otherwise, returning response data to the mobile device, and returning to step S02; and S05) determining, by the USB device, the type of operating system of the mobile device, organizing response data according to the first preset configuration information corresponding to iOS system, returning the response data to the mobile device, and returning to step S02 if the type of operating system of mobile device is iOS system; the first preset configuration information including a first preset configuration descriptor and a first preset interface descriptor; and organizing response data according to the second preset configuration information corresponding to non-iOS system, returning response data to the mobile device and returning to step S02 if the type of operating system of mobile device is non-iOS system; the second preset configuration information including a second preset configuration descriptor and a second preset interface descriptor.

According to the other aspect of the present invention, there is provided a USB device, including an initializing and setting module, a receiving and determining module, a storing and determining module, a first setting module, an organizing and determining module, a second setting module, a determining system type module, a first organizing module, a second organizing module and a sending module;

the initializing and setting module is configured to power on and initialize the USB device; and set the type of operating system of mobile device as unidentified;

the receiving and determining module is configured to receive an instruction sent from the mobile device, and to determine a type of the instruction;

the storing and determining module is configured to store a device address in a setting address instruction and determine whether the type of operating system of mobile device is unidentified when the receiving and determining module determines that the type of the instruction is the setting address instruction;

the first setting module is configured to set the type of operating system of mobile device as iOS operating system when the storing and determining module determines that the type of operating system of mobile device is unidentified;

the sending module is configured to return response data to the mobile device and to trigger the receiving and determining module when the storing and determining module determines that the type of operating system of mobile device is unidentified; and to return response data and to trigger the receiving and determining module when the storing and determining module determines that the type of operating system of mobile device is not unidentified;

the organizing and determining module is configured to organize response data according to a preset device descriptor and determine whether the type of operating system of mobile device is unidentified when the receiving and determining module determines the instruction is an obtaining device descriptor instruction;

the second setting module is configured to set the type of operating system of mobile device is non-iOS operating system when the organizing and determining module determines the type of operating system of mobile device is unidentified;

the sending module is further configured to return response data organized by the organizing and determining module to the mobile device, and to trigger the receiving and determining module when the organizing and determining module determines that the type of operating system of mobile device is unidentified; or is further configured to return response data organized by the organizing and determining module to the mobile device and to trigger the receiving and determining module when the organizing and determining module determines that the type of operating system of mobile device is not unidentified;

the determining system type module is configured to determine the type of operating system of mobile device when the receiving and determining module determines that the instruction is an obtaining configuration descriptor instruction;

the first organizing module is configured to organize response data according to the first preset configuration information corresponding to iOS system when the determining system type module determines that the type of operating system of mobile device is iOS system; the first preset configuration information includes a first preset configuration descriptor and a first preset interface descriptor;

the sending module is further configured to return the response data organized by the first organizing module to the mobile device, and to trigger the receiving and determining module;

the second organizing module is configured to organize response data according to the second preset configuration information corresponding to non-iOS system when the determining system type module determines that the type of operating system of mobile device is non-iOS system; the second preset configuration information includes the second preset configuration descriptor and the second preset interface descriptor; and the sending module is further configured to return the response data organized by the second organizing module to the mobile device, and to trigger the receiving and determining module.

According to the present invention, the USB device can distinguish the operating system of mobile device is iOS operating system or non-iOS operating system; and the USB device reports the mobile device which type of the USB device is via returning different configuration descriptor and the preset interface descriptor to the mobile device according to the type of the operating system, the type of the USB device includes MFI device, HID device, SCSI device, CCID device, or other devices.

EMBODIMENTS OF THE INVENTION

In order to make the object of the invention, the technical solutions and the merits of the present invention clear, some embodiments thereof will be illustrated in detail together with the companying drawings.

The present invention is described as follows:

In the present invention, the mobile device includes a tablet PC or mobile phone, etc.

In Embodiments, the non-iOS operating system includes but not limits to the android operating system, the Harmony operating system, the BlackBerry operating system, and Software operating system, etc.

In Embodiments, Acknowledge Character (ACK) means the characters received has no error; the data receiver checks the received message, sends confirming answer ACK to the data sender if the received message has no error, which means the information is received correctly, and the data receiver prepares to receive the next message; when receiving ACK signal, the sender can send the next data. If not receiving the signal, the sender may resend the current data package or stop sending data; within the data transmission of USB device, the ACK is configured to report correct transmission to the mobile device/USB device.

Embodiment 1

Figure 1:
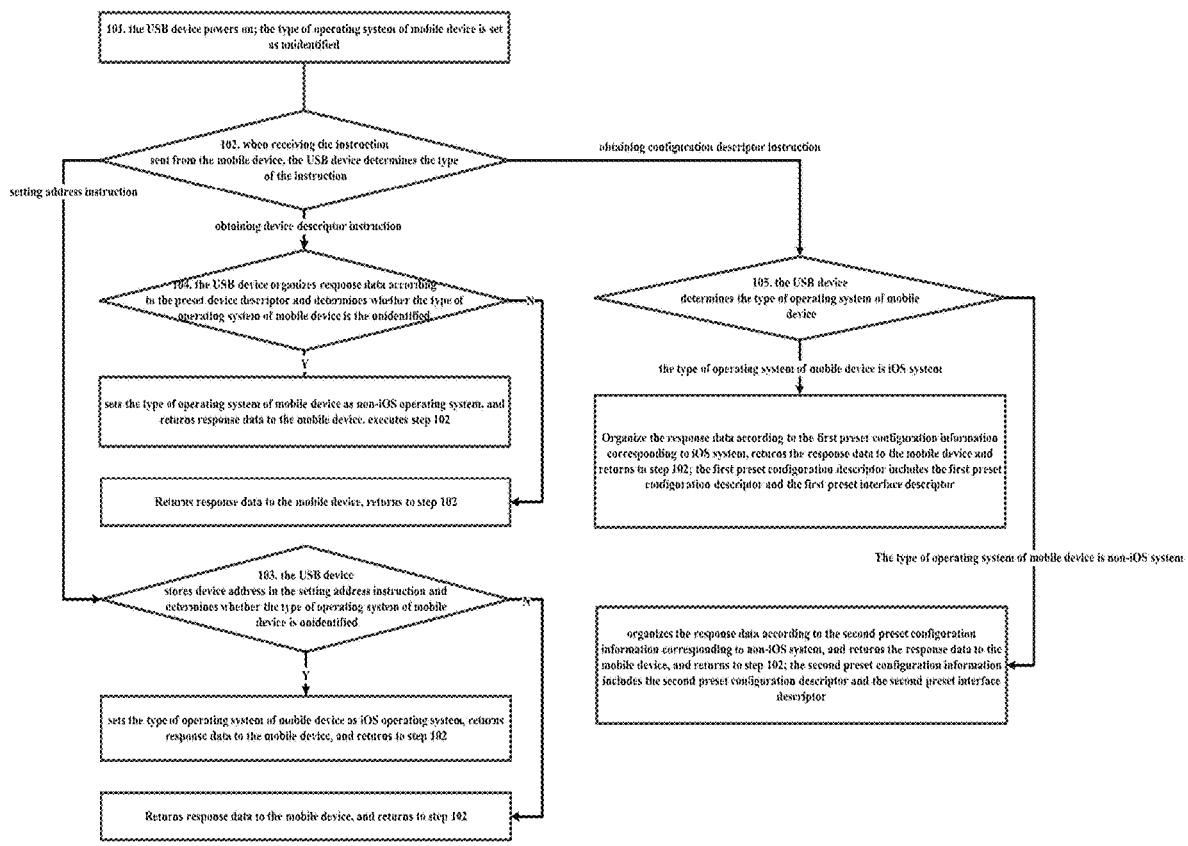
FIG. 1 is a flow diagram of a method for distinguishing operating system of a mobile device by a USB device according to Embodiment 1 of the present invention.

According to Embodiment 1, it provides a method for distinguishing operating system of a mobile device by a USB device, as shown in FIG. 1, includes the following steps.

Step 101, the USB device powers on; the type of operating system of mobile device is set as unidentified;

Preferably, step 101 specifically is that the USB device obtains byte data of the sixth preset length from an instruction as the type data when receiving the instruction sent from the mobile device, determines a type of the type data, the instruction is a setting address instruction if the type data is the first preset data; and the instruction is an obtaining device descriptor instruction if the type data is the second preset data; the instruction is an obtaining configuration descriptor instruction if the type data is the third preset data.

Step 102, when receiving the instruction sent from the mobile device, the USB device determines the type of the instruction, and executes step 103 if the instruction is a setting address instruction; executes step 104 if the instruction is an obtaining device descriptor instruction; and executes step 105 if the instruction is the obtaining configuration descriptor instruction.

Step 103, the USB device stores device address in the setting address instruction and determines whether the type of operating system of mobile device is unidentified, if yes, sets the type of operating system of mobile device as iOS operating system, returns response data to the mobile device, and returns to step 102; otherwise, returns response data to the mobile device, and returns to step 102.

Preferably, step 102 further includes: the USB device organizes response data according to the preset report descriptor, and returns response data to the mobile device and returns to step 102 if the instruction is the obtaining report descriptor instruction.

Furthermore, the USB device organizing response data according to the preset report descriptor specifically is the USB device determines whether a fourth preset length in the obtaining report descriptor is larger than or equals the length of preset report descriptor, if yes, executes step 102-11; otherwise, executes step 102-12.

Furthermore, step 102-11, the USB device makes the preset report descriptor as the response data.

Furthermore, step 102-12, the USB device obtains the data of the fourth preset length from the preset report descriptor as the response data.

Preferably, step 103 includes steps from step 103-11 to step 103-12.

Correspondingly, step 103-11, the USB device determines whether the type of operating system of mobile device is unidentified, if yes, sets the type of operating system of mobile device as iOS operating system, and executes step 103-12; otherwise, executes step 103-12.

Correspondingly, step 103-12, the USB device obtains device address from the setting address instruction and stores the device address, and returns response data to the mobile device, and returns to step 102.

Preferably, step 103 includes following steps from step 103-21 to step 103-23.

Correspondingly, step 103-21, the USB device obtains the device address from the setting address instruction and stores the device address.

Correspondingly, step 103-22, the USB device determines whether the type of operating system of mobile device as the unidentified, if yes, sets the type of operating system of mobile device as iOS operating system, and executes step 103-23; otherwise, executes step 103-23.

Correspondingly, step 103-23, the USB device returns response data to the mobile device, and returns to step 102.

Preferably, in step 103, the USB device storing the device address in the setting address instruction specifically is that the USB device obtains data on bytes from the third byte to the fourth byte from the setting address instruction as the device address and stores the device address.

Step 104, the USB device organizes response data according to the preset device descriptor and determines whether the type of operating system of mobile device is the unidentified, if yes, sets the type of operating system of mobile device as non-iOS operating system, and returns response data to the mobile device, and returns to step 102; otherwise, returns response data to the mobile device, and returns to step 102.

Preferably, step 104 includes following steps from step 104-11 to step 104-12.

Correspondingly, step 104-11, the USB device determines whether the type of operating system of mobile device is unidentified, if yes, sets the type of operating system of mobile device as non-iOS operating system, and executes step 104-12; otherwise, executes step 104-12.

Correspondingly, step 104-12, the USB device organizes response data according to the preset device descriptor, and returns response data to the mobile device, and returns to step 102.

Preferably, in step 104, the USB device organizing response data according to the preset device descriptor specifically is the USB device organizes the response data according to the first preset length in the obtaining device descriptor instruction, the length of the preset device descriptor and the preset device descriptor.

Furthermore, the USB device organizing response data according to the first preset length in the obtaining device descriptor instruction, the length of the preset device descriptor and the preset device descriptor specifically is the USB device determines whether the first preset length in the obtaining device descriptor instruction is larger than or equals the length of the preset device descriptor, if yes, organizes the response data according to the preset device descriptor; otherwise, obtains the data of the first preset length from the preset device descriptor as the response data.

Preferably, in step 103, setting the type of operating system of mobile device as iOS operating system is replaced by the USB device sets the type of operating system of mobile device as non-iOS operating system.

Correspondingly, when the type of operating system of mobile device is unidentified, step 103 further includes the USB device determines whether the obtaining device descriptor instruction identification is set, if yes, sets the type of operating system of mobile device as non-iOS system; otherwise, sets the setting address instruction identification.

Correspondingly, setting the type of operating system of mobile device as non-iOS operating system in step 104 is replaced by the USB device sets the type of operating system of mobile device as iOS operating system.

Correspondingly, when the type of operating system of mobile device is unidentified, step 104 further includes the USB device determines whether the setting address instruction is set, if yes, sets the type of operating system of mobile device as iOS system; otherwise, sets the obtaining device descriptor instruction identification.

Step 105, the USB device determines the type of operating system of mobile device, and organizes the response data according to the first preset configuration information corresponding to iOS system, and returns the response data to the mobile device and returns to step 102 if the type of operating system of mobile device is iOS system; the first preset configuration information includes the first preset configuration descriptor and the first preset interface descriptor; and organizes the response data according to the second preset configuration information corresponding to non-iOS system, and returns the response data to the mobile device, and returns to step 102 if the type of operating system of mobile device is non-iOS system; the second preset configuration information includes the second preset configuration descriptor and the second preset interface descriptor.

Preferably, setting the type of operating system of mobile device as unidentified specifically is that the USB device sets the setting data of the first preset identification as the first identification data.

Correspondingly, determining the type of operating system of mobile device as unidentified specifically is that the USB device determines whether the setting data of the first preset identification equals the first identification data, if yes, the operating system of mobile device is unidentified; otherwise, the operating system of mobile device is identified.

Correspondingly, setting the type of operating system of mobile device as iOS operating system specifically is that the USB device sets the setting data of the first preset identification as the second identification data.

Correspondingly, setting the type of operating system of mobile device as non-iOS operating system specifically is that the USB device sets the set data of the first preset identification as the third identification data.

Correspondingly, in step 105, the USB device determining the type of operating system of mobile device specifically is that the USB device determines the type of the first preset identification, the type of operating system of mobile device is iOS system if the set data of the first preset identification is the second identification data; the type of operating system of mobile device is non-iOS system if the setting data of the second preset identification is the third identification data.

Preferably, step 104 includes following steps from step 104-21 to step 104-23.

Correspondingly, step 104-21, the USB device organizes the response data according to the preset device descriptor.

Correspondingly, step 104-22, the USB device determines whether the type of operating system of mobile device is unidentified, if yes, sets the type of operating system of mobile device as non-iOS operating system, and executes step 104-23; otherwise, executes step 104-23.

Correspondingly, step 104-23, the USB device returns the response data to the mobile device, and returns to step 102.

Preferably, step 105 further includes the USB device organizes response data according to the second preset configuration descriptor corresponding to the non-iOS system and the second preset interface descriptor if the type of operating system of mobile device is unidentified, and returns the response data to the mobile device, and returns to step 102.

Preferably, organizing response data according to the first preset configuration information corresponding to iOS system in step 105 includes following steps from step 105-11 to step 105-13.

Correspondingly, step 105-11, the USB device obtains the first preset configuration information corresponding to iOS system; determines whether the second preset length in the obtaining configuration descriptor instruction is larger than or equals the length of the first preset configuration information, if yes, executes step 105-12; otherwise, executes step 105-13.

Correspondingly, step 105-12, the USB device makes the first preset configuration information as the response data.

Correspondingly, step 105-13, the USB device obtains data of the second preset length from the first preset configuration information as the response data.

Preferably, in Embodiment 1, the first preset configuration information includes the first preset configuration descriptor and the first preset interface descriptor which are joint successively.

Preferably, in Embodiment 1, the first preset configuration information further includes the first endpoint descriptor and the second endpoint descriptor.

Preferably, in step 105, organizing response data according to the second preset configuration information corresponding to the non-iOS system specifically includes steps from step 105-21 to step 105-23.

Correspondingly, step 105-21, the USB device obtains the second preset configuration information corresponding to non-iOS system; determines whether the third preset length in the obtaining configuration descriptor is larger than or equals the length of the second preset configuration information, if yes, executes step 105-22; otherwise, executes step 105-23.

Correspondingly, step 105-22, the USB device makes the second preset configuration information as the response data.

Correspondingly, step 105-23, the USB device obtains data of the third preset length from the second preset configuration information as the response data.

Preferably, in Embodiment 1, the second preset configuration information includes the second preset configuration descriptor and the second preset interface descriptor which are joint successively.

Preferably, in Embodiment 1, the second preset configuration information includes the second endpoint descriptor and the second endpoint descriptor.

Embodiment 2

Figure 2:
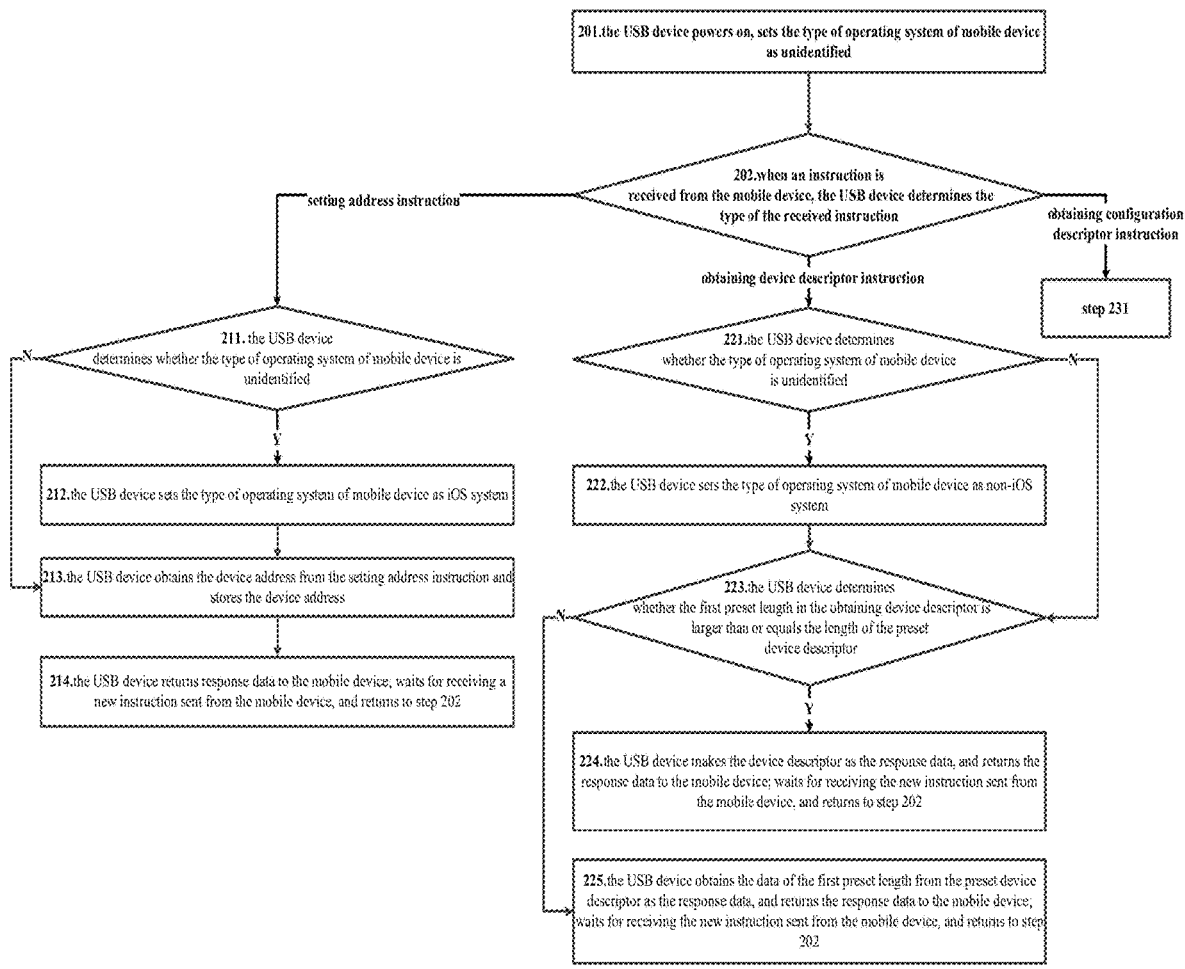
FIG. 2 and FIG. 3 are flow diagrams of a method for distinguishing operating system of a mobile device by a USB device according to Embodiment 2 of the present invention.
Figure 3:
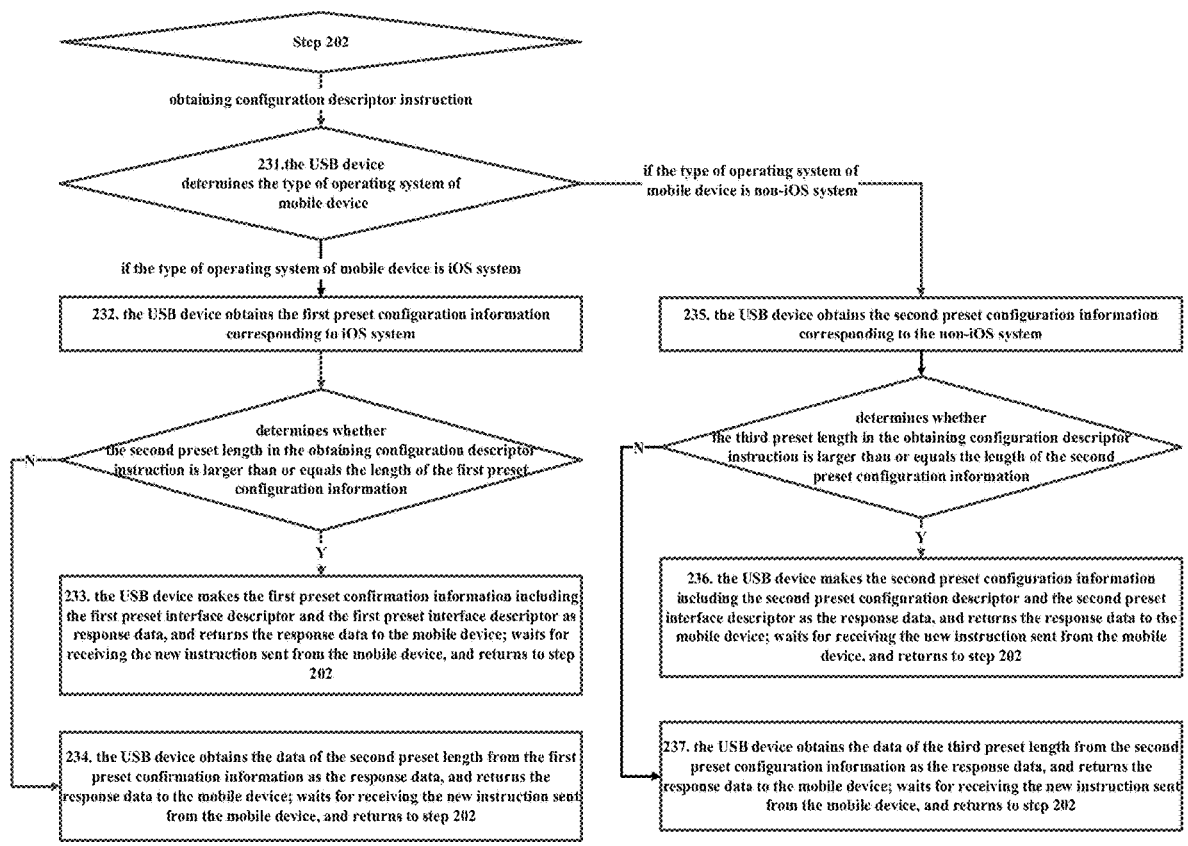

According to Embodiment 2, it provides a method for distinguishing operating system by USB device, as shown in FIG. 2 and FIG. 3, includes the following steps.

Step 201, the USB device powers on, sets the type of operating system of mobile device as unidentified.

Preferably, step 201 specifically is that the USB device powers on, the setting data of the first preset identification as the first identification data.

For instance, the USB device powers on, the setting data of the first preset identification is set as the first identification data 0x01.

Step 202, when an instruction is received from the mobile device, the USB device determines the type of the received instruction, and executes step 211 if the instruction is the setting address instruction; executes step 221 if the instruction is the obtaining device descriptor instruction; executes step 231 if the instruction is the obtaining configuration descriptor instruction.

Preferably, step 202 specifically is that the USB device obtains byte data of the sixth preset length from the received instruction as the type data, determines the type of type data, the instruction is the setting address instruction if the type data is the first preset data, and executes step 211; the instruction is the obtaining device descriptor instruction and step 221 is executed if the type data is the second preset data; the instruction is the obtaining configuration descriptor instruction and step 231 is executed if the type data is the third preset data.

Preferably, step 202 more specifically is that the USB device obtains byte data of 4 bytes from the received instruction as the type data, determines the type of type data, the instruction is the setting address instruction if the type data is the first preset data, and executes step 211; if the type data is the second preset data, the instruction is the obtaining device descriptor instruction, and executes step 221; if the type data is the third preset data, the instruction is the obtaining descriptor instruction, and executes step 231.

Preferably, step 202 specifically is that when the instruction sent from the mobile device is received, the USB device obtains type data from the instruction, and determines the type of the instruction according to the type data, and executes step 211 if the instruction is the setting address instruction; executes step 221 if the instruction is the obtaining device descriptor instruction; and executes step 231 if the instruction is the obtaining configuration descriptor instruction.

Furthermore, step 202 specifically is that the USB device obtains type data of three byte length from the received instruction as the type data, determines the type of type data, the instruction is the setting address instruction if the type data is the first preset data, and executes step 211; the instruction is the obtaining device descriptor instruction if the type data is the second preset data, and executes step 221; the instruction is the obtaining configuration descriptor instruction if the type data is the third preset data, and executes step 231.

Furthermore, step 202 specifically is that the USB device obtains data on the first byte, data on the second byte, data on the fourth byte from the received instruction as type data when receiving the instruction sent from the mobile device, determines the type of the type data, and the instruction is the setting address instruction if the type data is the first preset data, and executes step 211; the instruction is the obtaining device descriptor instruction if the type data is the second preset data, and executes step 221; the instruction is the obtaining configuration descriptor instruction if the type data is the third preset data, and executes step 231.

Preferably, step 202 specifically is that the USB device determines the type of the data on the first byte, the type of the data on the second byte, the type of the data on the fourth byte successively when receiving the instruction sent from the mobile device, and determines the type of instruction according to the type of data, and executes step 211 if the instruction is the setting address instruction; and executes step 221 if the instruction is the obtaining device descriptor instruction; and executes step 231 if the instruction if the obtaining configuration descriptor instruction.

Furthermore, step 202 specifically is that the USB device determines the type of data on the first byte of the received instruction, the type of the data on the second byte, the type of the data on the fourth byte successively; when the data on the first byte is the tenth preset data, the data on the second byte is the fourteenth preset data, and the data on the fourth byte is the tenth preset data, the instruction is the setting address instruction, and step 211 is executed; when the data on the first byte is the sixteenth preset data, the data on the second is the fifteenth preset data, the data on the fourth byte is the eleventh preset data, the instruction is the setting address instruction, and step 221 is executed; when the data on the first byte is the sixteenth preset data, the data on the second byte is the fifteenth preset data, and the data on the fourth byte is the twelfth preset data, the instruction is the obtaining preset descriptor instruction, and step 231 is executed.

For instance, the USB device determines the type of the data on the first byte, the type of the data on the second byte, and the type of the data on the fourth byte successively of the received instruction, when the data on the first byte is the tenth preset data 0x00, the data on the second byte is the fourteenth preset data 0x05, and the data on the fourth byte is the tenth preset data 0x00, the instruction is the setting address instruction, and step 211 is executed; when the data on the first byte is the sixteenth preset data 0x80, the data on the second byte is the fifteenth preset data 0x06, and the data on the fourth byte is the eleventh preset data 0x01, the instruction is the setting address instruction, and step 221 is executed; when the data on the first byte is the sixteenth preset data 0x80, the data on the second byte is the fifteenth preset data 0x06, and the data on the fourth byte is the twelfth preset data 0x02, the instruction is the obtaining preset descriptor instruction, and step 231 is executed.

Preferably, step 202 further includes the USB device executes corresponding operation according to the received instruction if the instruction is another instruction.

Step 211, the USB device determines whether the type of operating system of mobile device is unidentified, if yes, executes step 212; otherwise, executes step 213.

Preferably, step 211 specifically is that the USB device determines whether the setting data of the first preset identification equals the first identification data, if yes, the type of operating system of mobile device is unidentified, and step 212 is executed; otherwise, the type of operating system of mobile device is identified, step 213 is executed.

For instance, the USB determines whether the setting data of the first preset identification equals the first identification data 0x01, if yes, the type of operating system of mobile device is unidentified, and step 212 is executed; otherwise, the type of operating system of mobile device is identified, and step 213 is executed.

Step 212, the USB device sets the type of operating system of mobile device as iOS system, and executes step 213.

Preferably, step 212 specifically is that the USB device sets the setting data of the first preset identification as the second identification data.

For instance, the USB device sets the setting data of the first preset identification as the second identification data 0x02.

Step 213, the USB device obtains the device address from the setting address instruction and stores the device address.

Preferably, step 213 specifically is that the USB device obtains data on bytes from the third byte to the fourth byte from the setting address instruction as the device address, and stores the device address.

For instance, the USB device obtains data 0x0100 on bytes from the third byte to the fourth byte from the setting address instruction 0x0005010000000000 as the device address 0x0100, and stores the device address 0x0100.

Step 214, the USB device returns response data to the mobile device; waits for receiving a new instruction sent from the mobile device, and returns to step 202.

Preferably, step 214 specifically is that the USB device makes preset confirmation character as response data, and returns the response data to the mobile device; and waits for receiving the new instruction sent from the mobile device, and returns to step 202.

Step 221, the USB device determines whether the type of operating system of mobile device is unidentified, if yes, executes step 222; otherwise, executes step 223;

Preferably, step 221 specifically is that the USB device determines whether the setting data of the first preset identification equals the first identification data, if yes, the type of operating system of mobile device is unidentified, and step 222 is executed; otherwise, the type of operating system is identified, and step 223 is executed.

Step 222, the USB device sets the type of operating system of mobile device as non-iOS system; and executes step 223.

Preferably, step 222 specifically is that the USB device sets the setting data of the first preset identification as the third identification data; and executes step 223.

For instance, the USB device sets the setting data of the first preset identification as the third identification data 0x03; or the USB device sets the setting data of the first preset identification as the third identification data else.

Step 223, the USB device determines whether the first preset length in the obtaining device descriptor instruction is larger than or equals the length of the preset device descriptor, if yes, executes step 224; otherwise, executes step 225.

Preferably, step 223 specifically is that the USB device obtains the data on the seventh byte and the eighth byte from the obtaining device descriptor instruction as the first preset length, determines whether the first preset length in the obtaining device descriptor instruction is larger than or equals the length of the preset device descriptor, if yes, executes step 224; otherwise, executes step 225.

For instance, the USB device obtains data 0x0800 on the seventh byte and the eighth byte from the obtaining device descriptor instruction as the first preset length 8, determines whether the first preset length 8 in the obtaining device descriptor instruction is larger than or equals the length of preset device descriptor 18, if yes, executes step 224; otherwise, executes step 225; in Embodiment 2, the first preset length 8 is smaller than the length of preset device descriptor 18, thus, step 225 is executed.

Preferably, step 223 can be replaced by that the USB device determines whether the first preset length in the obtaining device descriptor instruction is smaller than the length of preset device descriptor, if yes, executes step 225; otherwise, executes step 224.

Step 224, the USB device makes the device descriptor as the response data, and returns the response data to the mobile device; waits for receiving the new instruction sent from the mobile device, and returns to step 202.

Preferably, step 224 further includes that the USB device adds the preset confirmation character to the response data.

Step 225, the USB device obtains the data of the first preset length from the preset device descriptor as the response data, and returns the response data to the mobile device; waits for receiving the new instruction sent from the mobile device, and returns to step 202.

Preferably, step 225 further includes the USB device adds the preset confirmation character to the response data.

Preferably, step 225 more specifically is that the USB device obtains the data of the first preset length from the preset device descriptor as the response data, returns response data to the mobile device; waits for receiving the new instruction sent from the mobile device, and returns to step 202.

For instance, the USB device obtains the data 0x1201100100000008 of the first preset length 8 as the response data 0x1201100100000008, and returns the response data 0x1201100100000008 to the mobile device; waits for receiving the new instruction sent from the mobile device, and returns to step 202.

Step 231, the USB device determines the type of operating system of mobile device, and executes step 232 if the type of operating system of mobile device is iOS system; and executes step 235 if the type of operating system of mobile device is non-iOS system;

For instance, when the instruction in step 202 is 0x8006000200002000, the instruction in step 202 is the obtaining configuration descriptor instruction, and executes step 231.

Preferably, step 231 specifically is that the USB device determines the type of setting data of the first preset identification, and the type of operating system of mobile device is iOS system if the setting data of the first preset identification equals the second identification data, and step 232 is executed; and the type of operating system of mobile device is non-iOS system if the setting data of the first preset identification equals the third identification data, and step 235 is executed.

For instance, the USB device determines the type of the setting data of the first preset identification, and the type of operating system of mobile device is iOS system if the setting data of the first preset identification equals the second identification data 0x02, and step 232 is executed; the type of operating system of mobile device is non-iOS system if the setting data of the first preset identification equals the third identification data 0x03, and step 235 is executed.

Preferably, step 231 further includes that step 235 is executed if the type of operating system of mobile device is unidentified.

For instance, in the case that the setting data of the first preset identification equals the first identification data 0x01, the type of operating system of mobile device is unidentified, and step 235 is executed.

Step 232, the USB device obtains the first preset configuration information corresponding to iOS system; determines whether the second preset length in the obtaining configuration descriptor instruction is larger than or equals the length of the first preset configuration information, if yes, executes step 233; otherwise, executes step 234.

In Embodiment 2, the first preset configuration information which includes the first preset configuration descriptor and the first preset interface descriptor is preset when the USB device is released, and is identified that returning the first preset configuration information to the mobile device if the obtaining configuration descriptor instruction sent from the mobile device of iOS system is received.

For instance, the USB device obtains the first preset configuration information 0x090220000 10100805009040000002FFF000030705820240000007050102400000 corresponding to iOS system; determines whether the second preset length 0x20 in the obtaining configuration descriptor instruction 0x8006000200002000 is larger than or equals the length of the first preset configuration information 32, if yes, executes step 233; otherwise, executes step 234; takes the iOS system in step 231 as an example, in Embodiment 2, the second preset length 0x20 equals the length of the first preset configuration information 32, and executes step 233.

Preferably, the said step can be replaced by that the USB device obtains the first preset configuration information corresponding to iOS system; determines whether the second preset length in the obtaining device descriptor instruction is smaller than the length of the preset device descriptor, if yes, executes step 234; otherwise, executes step 233.

Step 233, the USB device makes the first preset confirmation information including the first preset interface descriptor and the first preset interface descriptor as response data, and returns the response data to the mobile device; waits for receiving the new instruction sent from the mobile device, and returns to step 202.

In Embodiment 2, the first preset interface descriptor in the first preset configuration information includes the byte data which identifies the device type of the USB device; in the case that the data on the sixth byte and the seventh byte in the first preset interface descriptor is 0xFFF0, the USB device is MFI device; then, the USB device will start handshake operation of Apple authentication process with the mobile device.

In the embodiment, MFI device which is MadeforiPhone, MadeforiPod, MadeforiPad is the USB device which pass the Apple authentication, and the MFI device must operate Apple authentication before communicating with Apple device.

For instance, the USB device makes the first preset configuration information 0x09022000010 10080500904000002FFF00003070582024000000705010 2400000 which includes the first preset configuration descriptor 0x090220000101008050 and the first preset interface descriptor 0x0904000002FFF00003 as the response data 0x090220000101008050090400002FFF0000307 0582024 00000007050102400000; and returns the response data 0x0902200001010080500904000000 2FFF0000307058 20240000007050102400000 to the mobile device; waits for receiving the new instruction sent from the mobile device, and returns to step 202.

Preferably, in Embodiment 2, the first preset configuration information further includes the first endpoint descriptor and the second endpoint descriptor; the first preset configuration information is preset when the USB device is released, and identified returning the first preset configuration information including the first endpoint descriptor and the second endpoint descriptor to the mobile device when the obtaining configuration descriptor instruction sent from the mobile device of iOS system is received.

For instance, the first endpoint descriptor is 0x07058202400000; and the second endpoint descriptor is 0x07050102400000.

Preferably, the said step further includes that the USB device adds the preset confirmation character to the response data.

Step 234, the USB device obtains the data of the second preset length from the first preset confirmation information as the response data, and returns the response data to the mobile device; waits for receiving the new instruction sent from the mobile device, and returns to step 202.

Preferably, the said step specifically is that the USB device obtains the data of the second preset length from the start of the first preset configuration descriptor in the first preset configuration information as the response data, and returns the response data to the mobile device; waits for receiving the new instruction sent from the mobile device, and returns to step 202.

Preferably, the said step more specifically is that the USB device obtains the data of the second preset length from the start of the first preset configuration descriptor in the first preset configuration information as the response data, and returns the response data to the mobile device; waits for receiving the new instruction sent from the mobile device, and returns to step 202.

Preferably, the said step further includes the USB device adds the preset confirmation character to the response data.

Step 235, the USB device obtains the second preset configuration information corresponding to the non-iOS system; determines whether the third preset length in the obtaining configuration descriptor instruction is larger than or equals the length of the second preset configuration information, if yes, executes step 236; otherwise, executes step 237.

In Embodiment 2, the second preset configuration information including the second preset configuration descriptor and the second preset interface descriptor is preset when the USB device is released, and identified that returning the second preset configuration information including the second preset configuration descriptor and the second preset interface descriptor to the mobile device when the obtaining configuration descriptor instruction sent by the mobile device of non-iOS system is received.

In Embodiment 2, the second preset interface descriptor in the second preset configuration information includes the byte data which identifies the device type of the USB device; in the case that the data on the sixth byte and the seventh byte in the second preset interface descriptor is 0x0300, the USB device is HID device; in the case that the data on the sixth byte and the seventh byte in the second preset interface descriptor is 0x0800, the USB device is SCSI device, in the case that the data on the sixth byte and the seventh byte in the second preset interface descriptor is 0x0B00, the USB device is CCID device; in the case that the data on the sixth byte and the seventh byte in the second preset interface descriptor is other data, the USB device is another device.

For instance, the USB device obtains the second preset configuration information 0x09022000 0101008019090 40000020300000007058203400002070501034000002 which corresponds to the non-iOS system; determines whether the third preset length 0x20 in the obtaining configuration descriptor instruction 0x8006000200002000 is larger than or equals the length of the second preset configuration information 32, if yes, executes step 236; otherwise, executes step 237; taking the non-iOS system in step 231 as an example, the second preset length 0x20 equals the length of the first preset configuration information 32, and executes step 236.

Preferably, the said step is replaced by that the USB device obtains the second preset configuration information corresponding to non-iOS system; determines whether the third preset length in the obtaining configuration descriptor instruction is smaller than the length of the second preset configuration information, if yes, executes step 237; otherwise, executes step 236.

Step 236, the USB device makes the second preset configuration information including the second preset configuration descriptor and the second preset interface descriptor as the response data, and returns the response data to the mobile device; waits for receiving the new instruction sent from the mobile device, and returns to step 202.

Preferably, step 236 further includes the USB device adds the preset confirmation character to the response data.

Preferably, the second preset configuration information including the third endpoint descriptor and the fourth endpoint descriptor is preset when the USB device is released, and identified that when the obtaining configuration descriptor instruction sent from the mobile device of non-iOS system is received, the second preset configuration information including the third endpoint and the fourth endpoint is returned to the mobile device.

For instance, the third endpoint descriptor is 0x07058203400002; and the fourth endpoint descriptor is 0x07050103400002.

For instance, the USB device makes the second preset configuration information 0x090220000 1010080190904 00000203000000070582034000002070501034000002
including the second preset configuration descriptor 0x090220000101008019 and the second preset interface descriptor 0x090400000203000000 as the response data, and returns the response data 0x090220000101 00801909040000020300000007058203400002070501034 00002 to the mobile device; waits for receiving a new instruction sent from the mobile device, and returns to step 202.

Step 237, the USB device obtains the data of the third preset length from the second preset configuration information as the response data, and returns the response data to the mobile device; waits for receiving the new instruction sent from the mobile device, and returns to step 202.

Preferably, the said step specifically is that the USB device obtains the data of the third preset length from the start of the second preset configuration information as the response data, returns the response data to the mobile device; waits for receiving a new instruction sent from the mobile device, and returns to step 202.

Preferably, the said step more specifically is that the USB device obtains the data of the third preset length from the start of the second preset configuration information as the response data, and returns the response data to the mobile device; waits for receiving the new instruction sent from the mobile device, and returns to step 202.

Preferably, the said step further includes the USB device adds the preset confirmation character to the response data.

Preferably, step 202 further includes if the instruction is the obtaining report descriptor instruction, step 241 is executed.

For instance, in Embodiment 2, if the instruction in step 202 is 0x8006002200002200, the instruction is the obtaining report descriptor instruction, step 241 is executed.

In Embodiment 2, in steps of normal process, just in case that the type of operating system of mobile device is non-iOS system and the USB device in the second preset interface descriptor is HID device, the obtaining report descriptor instruction sent from the mobile device is received; the object of sending the obtaining report descriptor instruction by the mobile device is confirming which HID device the USB device is via the obtaining preset report descriptor, for instance, HID device can be a mouse, a keyboard or identity authentication device, such as FIDO device, etc.

Step 241, the USB device determines whether the fourth preset length in the obtaining report descriptor instruction is larger than or equals the length of the preset report descriptor, if yes, executes step 242; otherwise, executes step 243.

Furthermore, the said step specifically is that the USB device obtains data on the seventh byte and the eighth byte from the obtaining report descriptor instruction as the fourth preset length, determines whether the fourth preset length is larger than or equals the length of the preset report descriptor, if yes, executes step 242; otherwise, executes step 243.

In Embodiment 2, the length of the preset report descriptor is not a fixed number, the preset report descriptor of related device type is preset according to the specific type of HID device of the USB device.

For instance, when the preset report descriptor is 0x06d0f10901A1010920150026FF0075089 54081020921150026FF00750895409102c0, the data on the second byte and the third byte in the preset report descriptor specifically represents the type of HID device.

Correspondingly, step 241 is that the USB device obtains the preset report descriptor 0x06d0f1 0901A1010920150026FF0075089540810209211 50026FF 00750895409102c0; the data 0x2200 on the seventh byte and the eighth byte in the obtaining report descriptor instruction is obtained as the fourth preset length 34, determines whether the fourth preset length 34 is larger than or equals the length of the preset report descriptor 0x06d0f10901A1010920150026FF007508954081020921 150026FF00 750895409102c0, if yes, executes step 242; otherwise, executes step 243; in which, the data 0xd0f1 on the second byte and the third byte of the preset report descriptor represents that the USB device is the identity authentication device of HID device.

Preferably, the said step is replaced by that the USB device determines whether the fourth preset length in the obtaining report descriptor instruction is smaller than the length of the preset report descriptor, if yes, executes step 243; otherwise, executes step 242.

Step 242, the USB device makes the preset report descriptor as the response data, and returns the response data to the mobile device; waits for receiving a new instruction sent from the mobile device, and returns to step 202.

For instance, the USB device makes the preset report descriptor 0x06d0f10901A10109201502 6FF007508954 081020921150026FF00750895409102c0 as the response data, and returns the response data 0x06d0f10901A 1010920150026FF00750895408102092115 0026FF007508 9540910 2 c0 to the mobile device; waits for receiving a new instruction sent from the mobile device, and returns to step 202.

Preferably, the said step further includes the USB device adds the preset confirmation character to the response data.

Step 243, the USB device obtains the data of the fourth preset length from the preset report descriptor as the response data, and returns the response data to the mobile device; waits for receiving a new instruction sent from the mobile device, and returns to step 202.

Preferably, said step specifically is that the USB device obtains the data of the fourth preset length from the start of the preset report descriptor as the response data; and returns the response data to the mobile device; and waits for receiving the new instruction sent from the mobile device, and returns to step 202.

Preferably, said step more specifically is that the USB device obtains the data of the fourth preset length from the start of the preset report descriptor as the response data; and returns the response data to the mobile device; and waits for receiving the new instruction sent from the mobile device, and returns to step 202.

Preferably, said step further includes that the USB device adds the preset confirmation character to the response data.

Preferably, when the type of operating system of mobile device is unidentified, step 211 further includes step M01: the USB device determines whether the obtaining device descriptor instruction identification is set, if yes, executes the step 212; otherwise, sets the setting address instruction identification, and executes step 213.

Correspondingly, step 212 is replaced by that the USB device sets the type of operating system of mobile device as non-iOS operating system.

Correspondingly, when the type of operating system of mobile device is unidentified, step 221 further includes step M02: the USB device determines whether the setting address instruction is set, if yes, executes step 222; otherwise, sets the obtaining device descriptor instruction identification, and executes step 223.

Correspondingly, step 222 is replaced by the USB device sets the type of operating system of mobile device as iOS operating system.

Furthermore, step M01 is replaced by the USB device determines whether the obtaining device descriptor instruction identification equals the fifth identification data, if yes, executes step 212; otherwise, sets the setting data of the setting address instruction identification as the fourth identification data; and executes step 213.

Furthermore, step M02 is replaced by that the USB device determines whether the setting address instruction equals the fourth identification data, if yes, executes step 222; otherwise, sets the setting data of the obtaining device descriptor instruction as the fifth identification data, and executes step 223.

Embodiment 3

Figure 4:
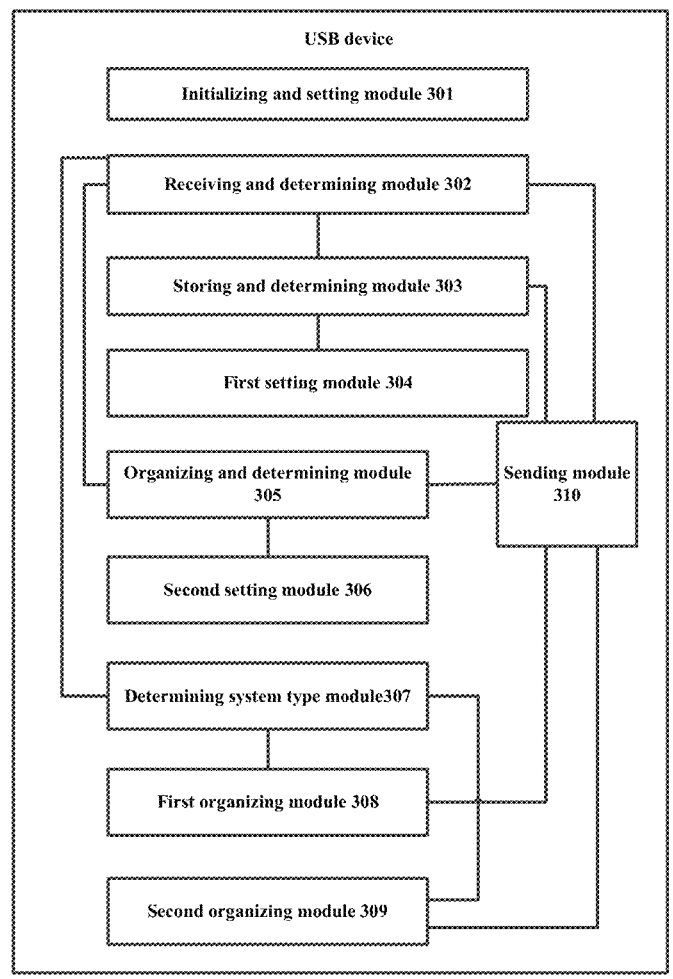
FIG. 4 is a block diagram of a USB device according to Embodiment 3 of the present invention.

According to Embodiment 3, it provides a USB device, as shown in FIG. 4, includes an initialing and setting module 301, a receiving and determining module 302, a storing and determining module 303, a first setting module 304, an organizing and determining module 305, a second setting module 306, a determining system type module 307, a first organizing module 308, a second organizing module 309 and a sending module 310.

The initializing and setting module 301 is configured to power on and initialize; and to set the type of operating system of mobile device as unidentified; and the receiving and determining module 302 is configured to receive the instruction sent from the mobile device, and determine the type of the instruction;

preferably, the receiving and determining module 302 is specifically configured to receive the instruction sent from the mobile device, obtain the byte data of the sixth preset length from the instruction as the type data, determine the type of type data, the instruction is the setting address instruction if the type data is the first preset data; the instruction is the obtaining device descriptor instruction if the type data is the second preset data; the instruction is the obtaining configuration descriptor instruction if the type data is the third preset data.

The storing and determining module 303 is configured to store the device address in the setting address instruction and determine whether the type of the operating system of mobile device is unidentified when the receiving and determining module 302 determines the instruction is the setting address instruction.

Preferably, the storing and determining module 303 includes a first storing unit and a first determining unit; the sending module 310 includes a first sending unit and a second sending unit.

Correspondingly, the first sending unit which is configured to return response data to the mobile device when the storing and determining module 303 determines the type of operating system of mobile device is unidentified, and to trigger the receiving and determining module 302.

Correspondingly, the second sending unit which is configured to return the response data to the mobile device when the storing and determining module 303 determines that the type of the operating system of mobile device is not unidentified, and to trigger the receiving and determining module 302.

Correspondingly, the first determining unit which is configured to determine whether the type of operating system of mobile device is unidentified when the receiving and determining module 302 determines the instruction is the setting address instruction.

Correspondingly, the first setting module 304 is specifically configured to set the type of operating system of mobile device as iOS operating system when the first determining module determines the type of operating system of mobile device is unidentified.

Correspondingly, the first storing unit which is configured to obtain the device address from the setting address instruction and store the device address when the first determining unit determines the type of operating system of mobile device is unidentified; is further configured to obtain the device address from the setting address instruction and store the device address when the first determining unit determines that the type of operating system of mobile device is not unidentified.

Correspondingly, the first sending unit which is specifically configured to return the response data to the mobile device when the first determining unit determines that the type of operating system of mobile device is unidentified, and to trigger the receiving and determining module 302.

Correspondingly, the second sending unit which is specifically configured to return response data to the mobile device when the first determining unit determines that the type of operating system of mobile device is not unidentified, and to trigger the receiving and determining module 302.

Preferably, the storing and determining module 303 includes the second storing unit and the second determining unit; the sending module 310 includes the first sending unit and the second sending unit.

Correspondingly, the first sending unit is configured to return the response data to the mobile device when the storing and determining module 303 determines yes, and to trigger the receiving and determining module 302.

Correspondingly, the sending unite is configured to return the response data to the mobile device when the storing and determining module 303 determine no, and to trigger the receiving and determining module 302.

Correspondingly, the second storing unit is configured to obtain the device address from the setting address instruction and store the device address when the receiving and determining module 302 determines the instruction is the setting address instruction.

Correspondingly, the second determining unit is configured to determine the type of operating system of mobile device as unidentified.

Correspondingly, the first setting module 304 is specifically configured to set the type of operating system of mobile device as iOS operating system when the second determining unit determines yes.

Correspondingly, the first sending unit is specifically configured to return response data to the mobile device when the second determining unit determines yes, and to trigger the receiving and determining module 302.

Correspondingly, the second sending unit is specifically configured to return the response data to the mobile device when the second determining unit determines no, and to trigger the receiving and determining module 302.

Preferably, the storing and determining module 303 is configured to store the device address in the setting address instruction specifically is that the storing and determining module 303 is configured to obtain data on bytes from the third byte to the fourth byte from the setting address instruction as the device address and store the device address.

The first setting module 304 is configured to set the type of operating system of mobile device as iOS operating system when the storing and determining module 303 determines yes.

The sending module 310 is configured to return the response data to the mobile device when the storing and determining module 303 determines yes, and to trigger the receiving and determining module 302; is further configured to return the response data to the mobile device when the storing and determining module 303 determines no, and to trigger the receiving and determining module 302.

The organizing and determining module 305 is configured to organize the response data according to the preset device descriptor and determine whether the type of operating system of mobile device is unidentified when the receiving and determining module 302 determines the instruction is the obtaining device descriptor instruction.

Preferably, the organizing and determining module 305 includes the third organizing unit and the third determining unit; the sending module 310 includes the third sending unit and the fourth sending unit.

Correspondingly, the third sending unit is configured to return the response data organized by the organizing and determining module 305 to the mobile device when the organizing and determining module 305 determines yes, and to trigger the receiving and determining module 302.

Correspondingly, the fourth sending unit is configured to return the response data organized by the organizing and determining module 305 to the mobile device when the organizing and determining module 305 determines no, and to trigger the receiving and determining module 302.

Correspondingly, the third determining unit which is configured to determine whether the type of operating system of mobile device is unidentified.

Correspondingly, the second setting module 306 is specifically configured to set the type of operating system of mobile device as non-iOS operating system when the third determining unit determines yes.

Correspondingly, the third organizing unit which is configured to organize the response data according to the preset device descriptor when the third determining unit determines yes; is further configured to organize the response data according to the preset device descriptor when the third determining unit determines no.

Correspondingly, the third sending unit is specifically configured to return the response data organized by the third organizing unit when the third determining unit determines yes, and to trigger the receiving and determining module 302.

Correspondingly, the fourth sending unit is specifically configured to return the response data organized by the third organizing unit to the mobile device when the third determining unit determines no, and to trigger the receiving and determining module 302.

Preferably, the organizing and determining module 305 is specifically configured to organize the response data according to the first preset length, the length of the preset device descriptor and the preset device descriptor in the obtaining device descriptor instruction when the organizing and determining module 305 is configured to organize the response data according to the preset device descriptor.

Furthermore, the organizing and determining module 305 is configured to organize the response data according to the first preset length, the length of the preset device descriptor and the preset device descriptor in the obtaining device descriptor instruction specifically is that the organizing and determining module 305 is configured to determine whether the first preset length in the obtaining device descriptor instruction is larger than or equals the length of the preset device descriptor, if yes, to organize the response data according to the preset device descriptor; otherwise, to obtain data of the first preset length from the preset device descriptor as the response data.

The second setting module 306 is configured to set the type of operating system of mobile device as non-iOS operating system when the organizing and determining module 305 determines yes.

Preferably, the organizing and determining module 305 includes the fourth organizing unit and the fourth determining unit; the sending module 310 includes the third sending unit and the fourth sending unit.

Correspondingly, the third sending unit is configured to return the response data organized by the organizing and determining module 305 to the mobile device when the organizing and determining module 305 determines yes, and to trigger the receiving and determining module 302.

Correspondingly, the fourth sending unit is configured to return the response data organized by the organizing and determining module 305 to the mobile device when the organizing and determining module 305 determines no, and to trigger the receiving and determining module 302.

Correspondingly, the fourth organizing unit is configured to organize the response data according to the preset device descriptor when the receiving and determining module 302 determines the instruction is the obtaining device descriptor instruction.

Correspondingly, the fourth determining unit is configured to determine whether the type of operating system of mobile device is unidentified.

Correspondingly, the second setting module 306 is specifically configured to set the type of operating system of mobile device as iOS operating system when the fourth determining unit determines yes.

Correspondingly, the third sending unit is specifically configured to return the response data organized by the fourth organizing unit to the mobile device when the fourth determining unit determines yes, and to trigger the receiving and determining module 302.

Correspondingly, the fourth sending unit is specifically configured to return the response data organized by the fourth organizing unit to the mobile device when the fourth determining unit determines no, and to trigger the receiving and determining module 302.

The sending module 310 is further configured to return the response data organized by the organizing and determining module to the mobile device when the organizing and determining module 305 determines yes, and to trigger the receiving and determining module 302; and is further configured to return the response data organized by the organizing and determining module 305 to the mobile device when the organizing and determining module 305 determines no, and to trigger the receiving and determining module 302.

The determining system type module 307 is configured to determine the type of operating system of mobile device when the receiving and determining module 302 determines the instruction is the obtaining configuration descriptor instruction.

Preferably, the initializing and setting module 301 is configured to set the type of operating system of mobile device as unidentified specifically is that the initializing and setting module 301 is configured to set the setting data of the first preset identification as the first identification data.

Correspondingly, the storing and determining module 303 is specifically configured to determine whether the setting data of the first preset identification equals the first identification data when the storing and determining module 303 is configured to determine the type of operating system of mobile device as unidentified, if yes, the operating system of mobile device is unidentified; otherwise, the operating system of mobile device is identified.

Correspondingly, the first setting module 304 is specifically configured to set the setting data of the first preset identification as the second identification data when the storing and determining module 303 determines yes.

Correspondingly, the second setting module 306 is specifically configured to set the setting data of the first preset identification as the third identification data when the organizing and determining module 305 determines yes.

Correspondingly, the determining system type module 307 is specifically configured to determine the type of the first preset identification when the receiving and determining module 302 determines the instruction is the obtaining configuration descriptor instruction, and the type of operating system of mobile device is iOS system if the setting data of the first preset identification is the second identification data; the operating system of mobile device is non-iOS system if the setting data of the second preset identification is the third identification data.

The first organizing module 308 is configured to organize the response data according to the first preset configuration information corresponding to iOS system if the determining system module 307 determines the type of operating system of mobile device is iOS system; the first preset configuration information includes the first preset configuration descriptor and the first preset interface descriptor.

Preferably, the first preset configuration information includes the first preset configuration descriptor and the first preset interface descriptor which are joint successively.

Preferably, the first preset configuration information further includes the first endpoint descriptor and the second endpoint descriptor.

Preferably, the first organizing module 308 is specifically configured to determine whether the second preset length in the obtaining configuration descriptor information is larger than or equals the length of the first preset configuration information if the determining system type module 307 determines the type of operating system of mobile device is iOS system, if yes, to make the first preset configuration information as the response data; otherwise, to obtain the data of the second preset length from the first preset configuration information as the response data.

The sending module 310 is further configured to return the response data organized by the first organizing module 308 to the mobile device, and to trigger the receiving and determining module 302.

The second organizing module 309 is configured to organize the response data according to the second preset configuration information corresponding to non-iOS system if the determining system type module 307 determines the type of operating system of mobile device as non-iOS system; the second preset configuration information includes the second preset configuration descriptor and the second preset interface descriptor.

Preferably, the second preset configuration information includes the second preset configuration descriptor and the second preset interface descriptor which are jointed successively.

Preferably, the second preset configuration information further includes the second endpoint descriptor and the second endpoint descriptor.

Preferably, the second organizing module 309 is further configured to organize the response data according to the second preset configuration information corresponding to non-iOS system when the determining system type module 307 determines unidentified.

Preferably, the second organizing module 309 is specifically configured to obtain the second preset configuration information corresponding to non-iOS system if the determining system type module 307 determines the type of operating system of mobile device is the non-iOS system; to determine whether the third preset length in the obtaining configuration descriptor instruction is larger than or equals the length of the second preset configuration information, if yes, the make the second preset configuration information as the response data; otherwise, to obtain the data of the third preset length from the second preset configuration information as the response data.

The sending module 310 is further configured to return the response data organized by the second organizing module 309 to the mobile device, and to trigger the receiving and determining module 302.

Preferably, in Embodiment 3, the USB device further includes the third organizing module.

Correspondingly, the third organizing module is configured to organize the response data according to the preset report descriptor when the receiving and determining module 302 determines the instruction is the obtaining report descriptor instruction.

Furthermore, the third organizing module is specifically configured to determine whether the fourth preset length in the obtaining report descriptor instruction is larger than or equals the length of the preset report descriptor, if yes, to make the preset report descriptor as the response data; otherwise, to obtain the data of the fourth preset length from the preset report descriptor as the response data.

Correspondingly, the sending module 310 is further configured to return the response data organized by the third organizing module to the mobile device, and to trigger the receiving and determining module 302.

Preferably, in Embodiment 3, the USB device further includes the third setting module, the fourth setting module, the first setting module and the second setting module.

Correspondingly, the third setting module is configured to set the type of operating system of mobile device as non-iOS operating system when the storing and determining module 303 determines yes.

Correspondingly, the first setting module is configured to determine whether the obtaining device descriptor instruction identification is set when the storing and determining module 303 determines no, if yes, to trigger the third setting module; otherwise, to set the setting address instruction identification.

Correspondingly, the fourth setting module is configured to set the type of operating system of mobile device as iOS operating system when the organizing and determining module 305 determines yes.

Correspondingly, the second setting module is configured to determine whether the setting address instruction is set when the organizing and determining module 305 determines no, if yes, to trigger the fourth setting module; otherwise, to set the obtaining device descriptor instruction identification.

The above are only preferred embodiments of the present disclosure, however, the scope of protection of the present disclosure is not limited thereto. Any modification or substitution that can be easily envisaged by those of skill in the art within the technical scope disclosed by the present disclosure is intended to be included within the protection scope of the present disclosure. Therefore, the scope of protection of the present disclosure should be based on the scope of protection of the appended claims.

The invention claimed is:

1. A method for distinguish an operating system of a mobile device by a USB device, wherein said method comprises the following steps:
S01) powering on, by the USB device, and initializing, setting a type of the operating system of the mobile device as unidentified;
S02) determining, by the USB device a type of an instruction from the mobile device when receiving the instruction, and executing step S03 if the instruction is a setting address instruction; executing step S04 if the instruction is an obtaining device descriptor instruction; and executing step S05 if the instruction is an obtaining configuration descriptor instruction;
S03) storing, by the USB device, a device address in the setting address instruction, and determining whether the type of the operating system of the mobile device is unidentified, if yes, setting the type of the operating system of the mobile device as iOS operating system, and returning response data to the mobile device, then returning to step S02; otherwise, returning response data to the mobile device, and returning to step S02;
S04) organizing, by the USB device, the response data according to a preset device descriptor and determining whether the type of the operating system of the mobile device is unidentified, if yes, setting the type of the operating system of the mobile device as non-iOS operating system, and returning the response data to the mobile device, and then returning to step S02; otherwise, returning the response data to the mobile device, and returning to step S02; and S05) determining, by the USB device, the type of the operating system of the mobile device, organizing the response data according to a first preset configuration information corresponding to iOS system, returning the response data to the mobile device, and returning to step S02 if the type of the operating system of the mobile device is the iOS system; the first preset configuration information including a first preset configuration descriptor and a first preset interface descriptor; and organizing the response data according to a second preset configuration information corresponding to the non-iOS system, returning the response data to the mobile device and returning to step S02 if the type of the operating system of the mobile device is the non-iOS system;

the second preset configuration information including a second preset configuration descriptor and a second preset interface descriptor, and wherein the step S04 comprises the following steps:

S04-11) determining, by the USB device, whether the type of the operating system of the mobile device is unidentified, if yes, setting the type of the operating system of the mobile device as the non-iOS operating system, and executing the step S04-12; otherwise, executing the step S04-12; and S04-12) organizing, by the USB device, the response data according to the preset device descriptor, and returning the response data to the mobile device, and returning to the step S02.

2. The method as claimed in claim 1, wherein said setting the type of the operating system of the mobile device as unidentified specifically is setting, by the USB device, setting data of first preset identification as first identification data;

said determining whether the type of the operating system of the mobile device is unidentified specifically is determining, by the USB device, whether the setting data of the first preset identification equals the first identification data, if yes, the operating system of the mobile device is unidentified; otherwise, the operating system of the mobile device is identified;

said setting the type of the operating system of the mobile device as iOS operating system specifically is setting, by the USB device, the setting data of the first preset identification as second identification data;

said setting the type of the operating system of the mobile device as non-iOS operating system specifically is setting, by the USB device, the setting data of the first preset identification as third identification data; and in said step S05, said determining, by the USB device, the type of the operating system of the mobile device specifically is determining, by the USB device, the type of the first preset identification, the type of the operating system of the mobile device is the iOS system if the setting data of the first preset identification is the second identification data; and the type of the operating system of the mobile device is the non-iOS system if the setting data of the second preset identification is the third identification data.

3. The method as claimed in claim 1, wherein the step S02 specifically is obtaining, by the USB device, byte data of sixth preset length from the instruction sent from the mobile device as type data when receiving the instruction, determining type of the type data, the instruction is the setting address instruction if the type data is the first preset data; the instruction is the obtaining device descriptor instruction if the type data is the second preset data; and the instruction is the obtaining configuration descriptor instruction if the type data is the third preset data.

4. The method as claimed in claim 1, wherein the step S03 comprises the following steps:

S03-11) determining, by the USB device, whether the type of the operating system of the mobile device is unidentified, if yes, setting the type of the operating system of the mobile device as the iOS operating system, and executing step S03-12; otherwise, executing step S03-12; and S03-12) obtaining, by the USB device, the device address from the setting address instruction and storing the device address, and returning the response data to the mobile device, and returning to step S02.

5. The method as claimed in claim 1, wherein the step S03 comprises the following steps:

S03-21) obtaining, by the USB device, the device address from the setting address instruction and storing the device address;

S03-22) determining, by the USB device, whether the type of the operating system of the mobile device is unidentified, if yes, setting the type of the operating system of the mobile device as the iOS operating system, and executing the step S03-23; otherwise, executing the step S03-23; and S03-23) returning, by the USB device, the response data to the mobile device, and returning to the step S02.

6. The method as claimed in claim 1, wherein said organizing, by the USB device, the response data according to the preset device descriptor in the step S04 specifically is organizing, by the USB device, the response data according to a first preset length, a length of the preset device descriptor and the preset device descriptor in the obtaining device descriptor instruction.

7. The method as claimed in claim 1, wherein the step S05 further includes if the type of the operating system of the mobile device is unidentified, organizing, by the USB device, the response data according to the second preset configuration descriptor and the second preset interface descriptor corresponding to the non-iOS system, and returning the response data to the mobile device, and returning to the step S02.

8. The method as claimed in claim 1, wherein, said organizing the response data according to the first preset configuration information corresponding to the iOS system in the step S05 comprises the following steps:

S05-11) obtaining, by the USB device, the first preset configuration information corresponding to the iOS system; determining whether the second preset length in the obtaining configuration descriptor is greater than or equal to the length of the first preset configuration information, if yes, executing the step S05-12; otherwise, executing the step S05-13;

S05-12) making, by the USB device, the first preset configuration information as the response data; and S05-13) obtaining, by the USB device, data within the second preset length from the first preset configuration information as the response data.

9. A USB device, wherein said device comprises an initializing and setting module, a receiving and determining module, a storing and determining module, a first setting module, an organizing and determining module, a second setting module, a determining system type module, a first organizing module, a second organizing module and a sending module;

the initializing and setting module is configured to power on and initialize the device; and to set the type of an operating system of a mobile device as unidentified;

the receiving and determining module is configured to receive an instruction sent from the mobile device, and to determine a type of the instruction;

the storing and determining module is configured to store a device address in a setting address instruction and determine whether the type of the operating system of the mobile device is unidentified when the receiving and determining module determines that the type of the instruction is the setting address instruction;

the first setting module is configured to set the type of the operating system of the mobile device as an iOS operating system when the storing and determining module determines that the type of the operating system of the mobile device is unidentified;

the sending module is configured to return response data to the mobile device and trigger the receiving and determining module when the storing and determining module determines that the type of the operating system of the mobile device is unidentified;

and to return response data and trigger the receiving and determining module when the storing and determining module determines that the type of the operating system of the mobile device is not unidentified;

the organizing and determining module is configured to organize response data according to a preset device descriptor and determine whether the type of the operating system of the mobile device is unidentified when the receiving and determining module determines the instruction is an obtaining device descriptor instruction;

the second setting module is configured to set the type of the operating system of the mobile device is a non-iOS operating system when the organizing and determining module determines the type of the operating system of the mobile device is unidentified;

the sending module is further configured to return response data organized by the organizing and determining module to the mobile device, and trigger the receiving and determining module when the organizing and determining module determines that the type of the operating system of the mobile device is unidentified; or return response data organized by the organizing and determining module to the mobile device and trigger the receiving and determining module when the organizing and determining module determines that the type of the operating system of the mobile device is not unidentified;

the determining system type module is configured to determine the type of the operating system of the mobile device when the receiving and determining module determines that the instruction is an obtaining configuration descriptor instruction;

the first organizing module is configured to organize response data according to the first preset configuration information corresponding to the iOS system when the determining system type module determines that the type of the operating system of the mobile device is the iOS system; the first preset configuration information includes a first preset configuration descriptor and a first preset interface descriptor;

the sending module is further configured to return response data organized by the first organizing module to the mobile device, and trigger the receiving and determining module;

the second organizing module is configured to organize response data according to the second preset configuration information corresponding to the non-iOS system when the determining system type module determines that the type of the operating system of the mobile device is the non-iOS system; the second preset configuration information includes the second preset configuration descriptor and the second preset interface descriptor; and the sending module is further configured to return response data organized by the second organizing module to the mobile device, and trigger the receiving and determining module, and wherein the second organizing module is further configured to organize the response data according to the second preset configuration information corresponding to the non-iOS system when the determining system type module determines unidentified.

10. The USB device as claimed in claim 9, wherein the initializing and setting module is configured to set the type of the operating system of the mobile device as unidentified specifically is that the initializing and setting module is configured to set the setting data of the first preset identification as the first identification data;

the storing and determining module is configured to determine whether the type of the operating system of the mobile device is unidentified specifically is that the storing and the determining module is configured to determine whether the setting data of the first preset identification equals the first identification data, if yes, the operating system of the mobile device is unidentified; otherwise, the operating system of the mobile device is identified;

the first setting module is specifically configured to set the setting data of the first preset identification as the second identification data when the storing and determining module determines yes;

the second setting module is specifically configured to set the setting data of the first preset identification as the third identification data when the organizing and determining module determines yes; and the determining system type module is specifically configured to determine the type of the first preset identification when the receiving and determining module determines the instruction is the obtaining configuration descriptor instruction, and the type of the operating system of the mobile device is the iOS system if the setting data of the first preset identification is the second identification data; the type of the operating system of the mobile device is the non-iOS system if the setting data of the second preset identification is the third identification data.

11. The USB device as claimed in claim 9, wherein the receiving and determining module is specifically configured to receive the instruction sent from the mobile device, obtain the type data of the sixth preset length from the instruction as the type data, determine the type of the type data, the instruction is the setting address instruction if the type data is the first preset data; the instruction is the obtaining device descriptor instruction if the type data is the second preset data; and the instruction is the obtaining configuration descriptor instruction if the type data is the third preset data.

12. The USB device as claimed in claim 9, wherein the storing and determining module includes a first storing unit and a first determining unit; the sending module includes a first sending unit and a second sending unit;

the first sending unit is configured to return the response data to the mobile device when the storing and determining module determines yes, and trigger the receiving and determining module;

the second sending unit is configured to return the response data to the mobile device when the storing and determining module determines no, and trigger the receiving and determining module;

the first determining unit is configured to determine whether the type of the operating system of the mobile device is unidentified when the receiving and determining module determines the instruction is the setting address instruction;

the first setting module is specifically configured to set the type of the operating system of the mobile device as the iOS operating system when the first determining unit determines yes;

the first storing unit is configured to obtain the device address from the setting address instruction and store the device address when the first determining unit determines yes; or obtain the device address from the setting address instruction and store the device address when the first determining unit determines no;

the first sending unit is specifically configured to return the response data to the mobile device when the first determining unit determines yes, and trigger the receiving and determining module; and the second sending unit is configured to returns the response data to the mobile device when the first determining unit determines no, and trigger the receiving and determining module.

13. The USB device as claimed in claim 9, wherein the storing and determining module includes the second storing unit and the second determining unit;

the sending module includes the first sending unit and the second sending unit;

the first sending unit is configured to return the response data to the mobile device when the storing and determining module determines yes, and trigger the receiving and determining module;

the second sending unit is configured to returns the response data to the mobile device when the storing and determining module determines no, and trigger the receiving and determining module;

the second storing unit is configured to obtain the device address from the setting address instruction and store the device address when the receiving and determining module determines the instruction is the setting address instruction;

the second determining unit is configured to determine the type of the operating system of the mobile device is unidentified;

the first setting module is specifically configured to set the type of the operating system of the mobile device as the iOS operating system when the second determining unit determines yes;

the first sending unit is specifically configured to return the response data to the mobile device when the second determining unit determines yes, and trigger the receiving and determining module; and the second sending unit is specifically configured to return the response data to the mobile device when the second determining unit determines no, and trigger the receiving and determining module.

14. The USB device as claimed in claim 9, wherein the organizing and determining module includes a third organizing unit and a third determining unit; the sending module includes a third sending unit and a fourth sending unit;

the third sending unit is configured to return the response data organized by the organizing and determining module to the mobile device when the organizing and determining module determines yes, and trigger the receiving and determining module;

the fourth sending unit is configured to return the response data organized by the organizing and determining module to the mobile device when the organizing and determining module determines no, and trigger the receiving and determining module;

the third determining unit is configured to determine whether the type of the operating system of the mobile device is unidentified;

the second setting module is specifically configured to set the type of the operating system of the mobile device as the non-iOS operating system when the third determining unit determines yes;

the third organizing unit is configured to organize the response data according to the preset device descriptor when the third determining unit determines yes; or organize the response data according to the preset device descriptor when the third determining unit determines no;

the third sending unit is specifically configured to return the response data organized by the third organizing unit to the mobile device when the third determining unit determines yes, and trigger the receiving and determining module; and the fourth sending unit is specifically configured to return the response data organized by the third organizing unit to the mobile device when the third determining unit determines no, and trigger the receiving and determining module.

15. The USB device as claimed in claim 9, wherein the organizing and determining module includes a fourth organizing unit and a fourth determining unit; the sending module includes a third sending unit and a fourth sending unit;

the third sending unit is configured to return the response data organized by the organizing and determining module to the mobile device when the organizing and determining module determines yes, and trigger the receiving and determining module;

the fourth sending unit is configured to return the response data organized by the organizing and determining module to the mobile device when the organizing and determining module determines no, and trigger the receiving and determining module;

the fourth organizing unit is configured to organize the response data according to the preset device descriptor when the receiving and determining module determines the instruction is the obtaining device descriptor instruction;

the fourth determining unit is configured to determine the type of the operating system of the mobile device is unidentified;

the second setting module is specifically configured to set the type of the operating system of the mobile device as the non-iOS operating system when the fourth determining unit determines yes;

the third sending unit is specifically configured to return the response data organized by the fourth organizing unit to the mobile device when the fourth determining unit determines yes, and trigger the receiving and determining module; and the fourth sending unit is specifically configured to return the response data organized by the fourth organizing unit to the mobile device when the fourth determining unit determines no, and trigger the receiving and determining module.

16. The USB device as claimed in claim 9, wherein the organizing and determining module is configured to organize the response data according to the preset device descriptor specifically is that the organizing and determining module is configured to organize the response data according to the first preset length, the length of the preset device descriptor and the preset device descriptor in the obtaining device descriptor instruction.

17. The USB device as claimed in claim 9, wherein the first organizing module is specifically configured to determine whether the second preset length in the obtaining configuration descriptor is greater than or equal to the length of the first preset configuration information if the determining system type module determines the type of the operating system of the mobile device is the iOS system, if yes, making the first preset configuration information as the response data; otherwise, obtaining data within the second preset length from the first preset configuration information as the response data.

* * * * *